(12) United States Patent
Vizi et al.

(10) Patent No.: US 9,229,207 B2
(45) Date of Patent: Jan. 5, 2016

(54) LASER SCANNING MICROSCOPE WITH FOCUS-DETECTING UNIT

(71) Applicant: Femtonics Kft., Budapest (HU)

(72) Inventors: E. Szilveszter Vizi, Budapest (HU); Gergely Katona, Budapest (HU); J. Balazs Rozsa, Budapest (HU)

(73) Assignee: Femtonics Kft, Budapest (HU)

( * ) Notice: Subject to any disclaimer, the term of this patent is extended or adjusted under 35 U.S.C. 154(b) by 125 days.

(21) Appl. No.: 14/081,035

(22) Filed: Nov. 15, 2013

(65) Prior Publication Data

US 2014/0055852 A1      Feb. 27, 2014

Related U.S. Application Data

(63) Continuation-in-part of application No. 12/998,667, filed as application No. PCT/HU2009/000096 on Nov. 17, 2009, now abandoned.

(30) Foreign Application Priority Data

Nov. 17, 2008   (HU) ....................................... 0800686
Dec. 31, 2008   (EP) ..................................... 08462010

(51) Int. Cl.
*G02B 21/00*       (2006.01)
*G02B 21/06*       (2006.01)
*G02B 21/16*       (2006.01)

(52) U.S. Cl.
CPC .............. *G02B 21/06* (2013.01); *G02B 21/008* (2013.01); *G02B 21/0076* (2013.01); *G02B 21/16* (2013.01)

(58) Field of Classification Search
CPC ......................................................... G02B 21/06
USPC ........................................ 359/383; 250/201.3
See application file for complete search history.

(56) References Cited

U.S. PATENT DOCUMENTS

| | | | | |
|---|---|---|---|---|
| 5,122,648 | A * | 6/1992 | Cohen et al. | 250/201.3 |
| 5,132,526 | A * | 7/1992 | Iwasaki | 250/201.3 |
| 5,796,112 | A * | 8/1998 | Ichie | G02B 5/001 250/458.1 |
| 6,166,385 | A * | 12/2000 | Webb | G02B 21/0084 250/458.1 |
| 6,181,422 | B1 * | 1/2001 | Veltze | 356/600 |
| 6,433,325 | B1 * | 8/2002 | Trigg | 250/201.3 |
| 7,071,451 | B2 * | 7/2006 | Ishikawa et al. | 250/201.4 |
| 7,381,937 | B2 * | 6/2008 | Ashley et al. | 250/208.1 |
| 2003/0067607 | A1 * | 4/2003 | Wolleschensky | G02B 21/008 356/484 |
| 2003/0184855 | A1 * | 10/2003 | Yasuda et al. | 359/383 |
| 2006/0000962 | A1 * | 1/2006 | Imabayashi et al. | 250/201.2 |
| 2006/0001954 | A1 * | 1/2006 | Wahl et al. | 359/368 |
| 2007/0201123 | A1 * | 8/2007 | Saggau et al. | 359/285 |
| 2008/0225388 | A1 * | 9/2008 | Hirata | 359/385 |
| 2008/0283722 | A1 * | 11/2008 | Uchiyama et al. | 250/201.3 |
| 2011/0127406 | A1 * | 6/2011 | Sase | 250/201.3 |
| 2011/0211254 | A1 * | 9/2011 | Vizi et al. | 359/385 |

* cited by examiner

*Primary Examiner* — Frank Font
(74) *Attorney, Agent, or Firm* — Olson & Cepuritis, Ltd.

(57) ABSTRACT

A laser scanning reflection or fluorescent microscope is provided with focusing-detecting unit having a laser beam focusing objective, an image detector that detects light reflected from the sample or back fluoresced light emitted by the sample, and a drive that simultaneously displaces the objective and the image detector.

9 Claims, 8 Drawing Sheets

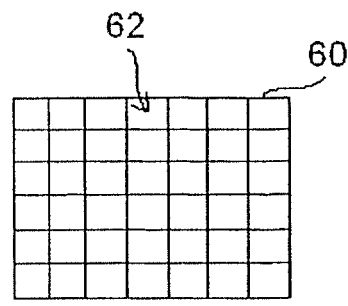
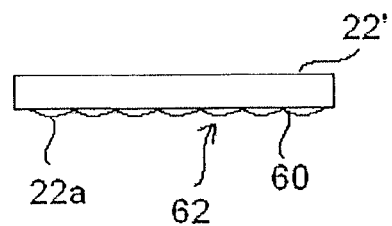
Fig. 8a                Fig. 8b
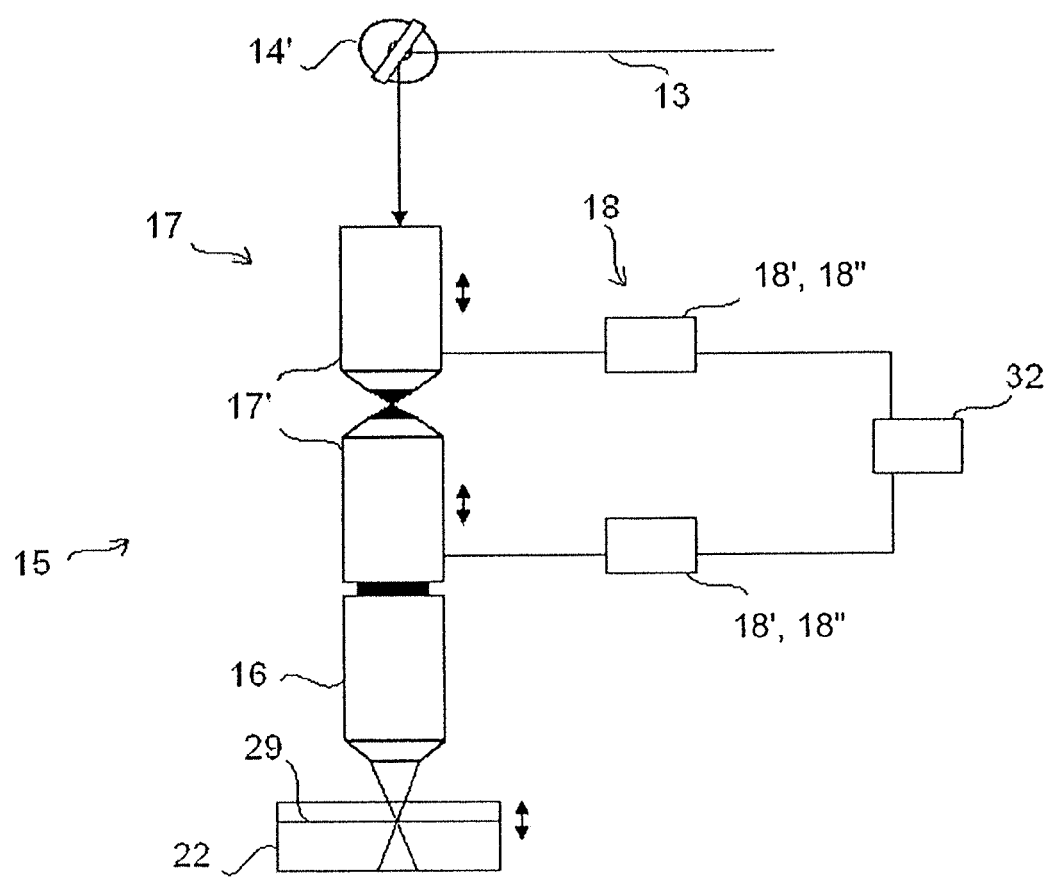
Fig. 9

LASER SCANNING MICROSCOPE WITH FOCUS-DETECTING UNIT

CROSS-REFERENCE TO RELATED APPLICATIONS

This application is a continuation-in-part of U.S. patent application Ser. No. 12/998,667, filed on Jul. 27, 2011 as U.S. National Phase entry of PCT/HU2009/000096, filed on Nov. 17, 2009, which claims priority of European Patent Application No. 08462010.3, filed Dec. 31, 2008 and Hungarian Patent Application No. P0800686, filed Nov. 17, 2008, each of which is incorporated herein by reference.

FIELD OF INVENTION

The present invention relates to laser scanning microscope measuring reflected radiation or excited fluorescence from the sample.

The invention further relates to a method for scanning a sample along a 3D trajectory with the use of the laser scanning microscope according to the invention.

BACKGROUND OF INVENTION

Three-dimensional (3D) laser scanning technologies have great importance in analysing biological specimens e.g. imaging 3D biological structures or mapping fluorescent markers of cell surface receptors on non-planar surfaces.

Commonly used 3D laser scanning microscopes are either confocal microscopes or two-photon (or multi-photon) microscopes. In the confocal microscope technology a pinhole is arranged before the detector to filter out light reflected from any other plane than the focus plane of the microscope objective. Thereby it is possible to image planes lying in different depths within a sample (e.g. a biological specimen).

Two-photon laser scanning microscopes use a laser light of lower energy of which two photons are needed to excite a flourophore in a quantum event, resulting in the emission of a fluorescence photon, which is then detected by a detector. The probability of a near simultaneous absorption of two photons is extremely low requiring a high flux of excitation photons, thus two-photon excitation practically only occurs in the focal spot of the laser beam, i.e. a small ellipsoidal volume having typically a size of approximately 300 nm×300 nm×1000 nm. Generally a femtosecond pulsed laser is used to provide the required photon flux for the two-photon excitation, while keeping the average laser beam intensity sufficiently low.

In order to decrease the required scanning time the laser beam is preferably deflected by known means to scan different points of a given focal plane (XY plane). Several known technologies exist for deflecting the laser beam prior to entering the objective, e.g. via deflecting mirrors mounted on galvanometric scanners, or via acousto-optical deflectors.

The galvanometric scanners and the acousto-optical deflectors are very fast devices, hence moving the focus spot to a desired XY plane position and obtaining measurement data via the detector in that position can be carried out in less than 1 ms.

Even two-dimensional (2D) scanning technologies commonly used for scanning and/or imaging thin specimen slides usually involve focal plane changing as well, i.e. the suitable slide-objective distance needs to be found for obtaining a sharp image since the optimal focus position may vary from slide to slide and even within the same specimen slide.

Focal plane changing (3D sampling) can be carried out by moving the sample stage and the focusing means (typically the objective) of the microscope relative to each other. This is either realised by moving the sample stage e.g. via stepping motors, or by displacing the microscope objective. Displacing the objective is generally regarded as being disadvantageous since this involves moving a greater mass, which implies setting the greater mass in motion and stopping it at the desired position. Accordingly, it is preferred to move the sample stage instead, which allows for much faster Z-scanning (scanning along the optical axis).

However, moving the stage is complicated to implement when using submerge specimen chambers or when electrical recording is performed on the biological specimen with microelectrodes. Accordingly, in the case of analysing biological specimens it is often preferred to move the focus spot of the laser beam instead of moving the specimen. This can be achieved by deflecting the laser beam to scan different points of a focal plane (XY plane) and for example by displacing the objective along its optical axis (Z axis) e.g. via a piezo-positioner to change the depth of the focal plane.

Information about the sample is provided by detecting the scanning beam reflected back from the specimen or in case of fluorescent microscopy by detecting the fluorescence light. Suitable detectors and measuring methods and corresponding image generating devices (e.g. detector, computer and monitor) are well known in the art. As explained above prior art efforts were directed to reduce the mass that is to be displaced during focusing. Accordingly, the detectors, which represent a considerable mass, were held in a fixed position while the objective was displaced relative to the sample and to the detector, or the sample was displaced relative to the objective and detector.

A typical prior art laser scanning microscope construction is illustrated in FIG. 1. As can be seen the laser scanning microscope 100 comprises a laser source 112 providing a laser beam 113 which is focused onto a sample 122 (e.g. a biological specimen) via microscope objective 116. In order to perform 3D sampling through focal plane change a drive 118 is provided for displacing the microscope objective 116 relative to the sample 122. A beam splitter 123 is arranged along the optical path of the scanning laser beam 113 for directing the reflected light 113' to a suitable detector 124. In order to move as little mass as possible the detector 124 is in a fixed position and only the objective 116 is displaced by the drive 118.

The first major drawback of this solution is that the optical distance between the objective 116 and the detector 124 needs to be relatively big, typically a 30-40 mm gap 101 is required between the top of the objective 116 (or the system supporting the objective 116) and the beam splitter 123 in order to be able to lift the objective when arranging the sample 122 on the stage. Such a long optical distance is particularly undesirable in the case of fluorescence microscopy where the scattered nature of the back fluoresced light 113' can lead to high losses along the relatively long optical path.

A second drawback of the prior art solution is associated with the varying optical distance between the objective 116 and the detector 124 when measuring biological specimens arranged at different height and/or when performing focal depth changing. This may lead to a fluctuation in the detected light intensity because varying optical distance means varying light intensity loss along the optical path even where the reflected light 113' is a reflected laser beam. Furthermore, detection and/or imaging of the specimen is rendered more complicated if the distance between the objective 116 and the detector 124 is not constant.

U.S. Pat. No. 5,132,526 discloses a microscope, which is based on the general prior art principle, i.e. only the objective is displaced relative to the sample, while the detectors are held in a fixed position. The problem of relatively long and varying optical distance between the detectors and the objective is overcome by providing the optical path partly inside an optical fiber, whereby a constant optical distance is maintained between the detectors and the objective. However, the use of an optical fiber only allows for detecting an image of the focus spot, meaning a confocal detection arrangement, since the same optical fiber is used to direct exciting light on the sample. In a confocal type detection the sample side focal plane of the objective is imaged onto the aperture placed immediately in front of the detector, hence only light propagating parallel to the objective axis will be detected. However, in case when all scattered reflected and fluorescent light contains useful information about the sample—e.g. in the case of two-photon microscopy—all light transmitted by the objective from the sample should be captured by the detector for best performance.

Due to the use of the optical fiber only a smaller fraction of all the light originating from the focus spot can be detected, hence this arrangement is not suitable for carrying out a non-confocal detection method as necessary e.g. in two-photon microscopy. It should be noted that although U.S. Pat. No. 5,132,526 also discloses a 4-segment photodetector that is displaced together with the objective, this photodetector is used to adjust focusing in a confocal arrangement. In order to achieve this task the pinhole from the front of the photodetector is removed and the detector is arranged to detect an image of the focus spot of the illuminating light in the sample, which allows for detecting whether or not the light is focused on a specific plane in the specimen.

It is an object of the present invention to overcome the problems associated with the prior art laser scanning microscopes and to provide a laser scanning microscope wherein the objective-detector distance is minimised and can be kept substantially constant regardless of the shape and height of a specimen to be examined, and optionally in the course of information collection from a 3D volume, while increasing the intensity of the detected light by detecting scattered, reflected or fluorescence light as well.

The present invention is based on the recognition that the above problems can be overcome by mounting an objective and an image detector arranged to detect an image from the back aperture of the objective on a common drive that simultaneously displaces both the objective and the detector. The objective and detector assembly are referred to as a "focusing-detecting unit".

It is a further object of the present invention to provide a 3D laser scanning microscope with the above advantages.

In "Imaging cellular network dynamics in three dimensions using fast 3D laser scanning" (Nature Methods, Vol. 4 No. 1, January 2007) Göbel et al. propose to drive a piezo-positioner of a laser scanning microscope objective with a sinusoidal signal and calculate an appropriate drive signal for the X-Y scanners (galvanometric scan mirrors) to obtain a desired 3D trajectory. The article discusses measurements made at a sinusoidal drive signal of 10 Hz and suggests adjustment of the drive signal to compensate for amplitude reduction and phase shift of the actual objective position with respect to the drive signal of the piezo-positioner.

One of the problems associated with the above method is a deviation from the desired scan trajectory because the movement of the objective deviates from sinusoidal owing to the properties of the piezo-positioner and other mechanical components. This problem is not crucial at low frequencies of the sinusoidal drive signal, such as the 10 Hz frequency used by Göbel et al. However, the deviation becomes more and more significant as the frequency is increased.

Being constrained to use low frequencies is less disturbing when scanning a large number of X-Y positions in each scanning plane (i.e. planes lying at different Z depths within the specimen) as the fast XY positioning allows for obtaining a plurality of scans while the focus plane remains substantially in the same Z plane. Thus, effectively, the relatively long time spent in each scanning plane is not wasted as a plurality of measurements can be carried out. On the other hand, when scanning specimens having only a few points of interest in each Z plane, e.g. a nerve cell dendrite crossing such planes, the aim is to spend as little time in each Z plane as possible in order to decrease the overall scan time. Therefore it would be desirable to increase the frequency of the sinusoidal drive signal but as indicated by Göbel et al., such an increase in the frequency would result in a higher deviation between the displacement of the objective and a theoretical sinusoidal displacement corresponding to the sinusoidal drive signal, which could lead to an intolerable deviation from the desired 3D scanning trajectory, effectively the positions of interest within the specimen could be out of focus or could be missed entirely.

It is a second object of the present invention to overcome the above problem and provide a method for decreasing the Z-scanning time when performing 3D sampling by moving the whole of the focusing-detecting unit in accordance with the inventive laser scanning microscope construction. It is a further object to provide a scanning method capable of compensating for a deviation between the motion of the focusing-detecting unit connected to a drive and the drive signal of the drive.

SUMMARY OF THE INVENTION

This object is achieved by a laser scanning reflection or fluorescent microscope for scanning a sample, the microscope comprising a focusing-detecting unit containing:

an objective for focusing a laser beam from a laser source, the objective having a back aperture and a focal plane, and an image detector arranged to detect an image from the back aperture of the objective;

and comprising a drive for simultaneously displacing the objective and the image detector of the focusing-detecting unit.

The drive may be provided for changing the position of the focal plane in the course of 3D sampling. Alternatively auxiliary drives are provided for displacing the at least one optical element of the objective for changing the position of the focal plane in the course of 3D sampling; or acousto-optical deflectors are provided for changing the position of the focal plane in the course of 3D sampling.

3D sampling from a volume sample may be performed by the inventive laser scanning microscope either by using the common drive of the focusing-detecting unit for changing the position of the microscope's focal plane or by providing an additional auxiliary drive for displacing one or more optical elements of the objective (e.g. the objective and/or focusing lenses) within the focusing-detecting unit. Such an auxiliary drive may be a piezo-positioner provided for displacing the objective (and/or focusing lenses).

For the purpose of 3D scanning the inventive microscope may preferably be used in combination with the above described technologies allowing for the continuous motion of either the focusing-detecting unit via the main drive or the focusing optical element (e.g. objective) via the auxiliary drive.

In a second aspect the invention provides a method for scanning a sample along a 3D trajectory characterised by using a laser scanning microscope having a focusing-detecting unit comprising:
objective having a focal plane, a back aperture, and having at least one optical element for focusing a laser beam from a laser source, and
an image detector arranged to detect an image from the back aperture of the objective,
and a drive for simultaneously displacing the objective and the image detector of the focusing-detecting unit means; the drive being provided for changing the position of the focal plane in the course of 3D sampling, or the microscope being provided with auxiliary drive for displacing the at least one optical element of the objective for changing the position of the focal plane in the course of 3D sampling; and
deflector for deflecting the laser beam,
the method comprising the steps of:
providing a periodical drive signal for the drive or the auxiliary drive for changing the position of the focal plane,
obtaining time dependant displacement data of the at least one optical element of the objective in response to the periodical drive signal,
providing a response function (z(t)) using the time dependant displacement data,
calculating a drive signal for the deflector using the response function (z(t)) to move the focal volume of the laser beam along the 3D trajectory within the sample.

Further advantageous embodiments of the invention are defined in the attached dependent claims.

Further details of the invention will be apparent from the accompanying figures and exemplary embodiments.

BRIEF DESCRIPTION OF DRAWINGS

FIG. 8a is a top view of a stage comprising a grid.

FIG. 8b is a side view of the grid of FIG. 8a with a sample supported thereupon.

FIG. 9 is a schematic diagram of an alternative embodiment of a objective in a laser scanning microscope according to the invention.

DETAILED DESCRIPTION OF PREFERRED EMBODIMENTS

Figure 2:
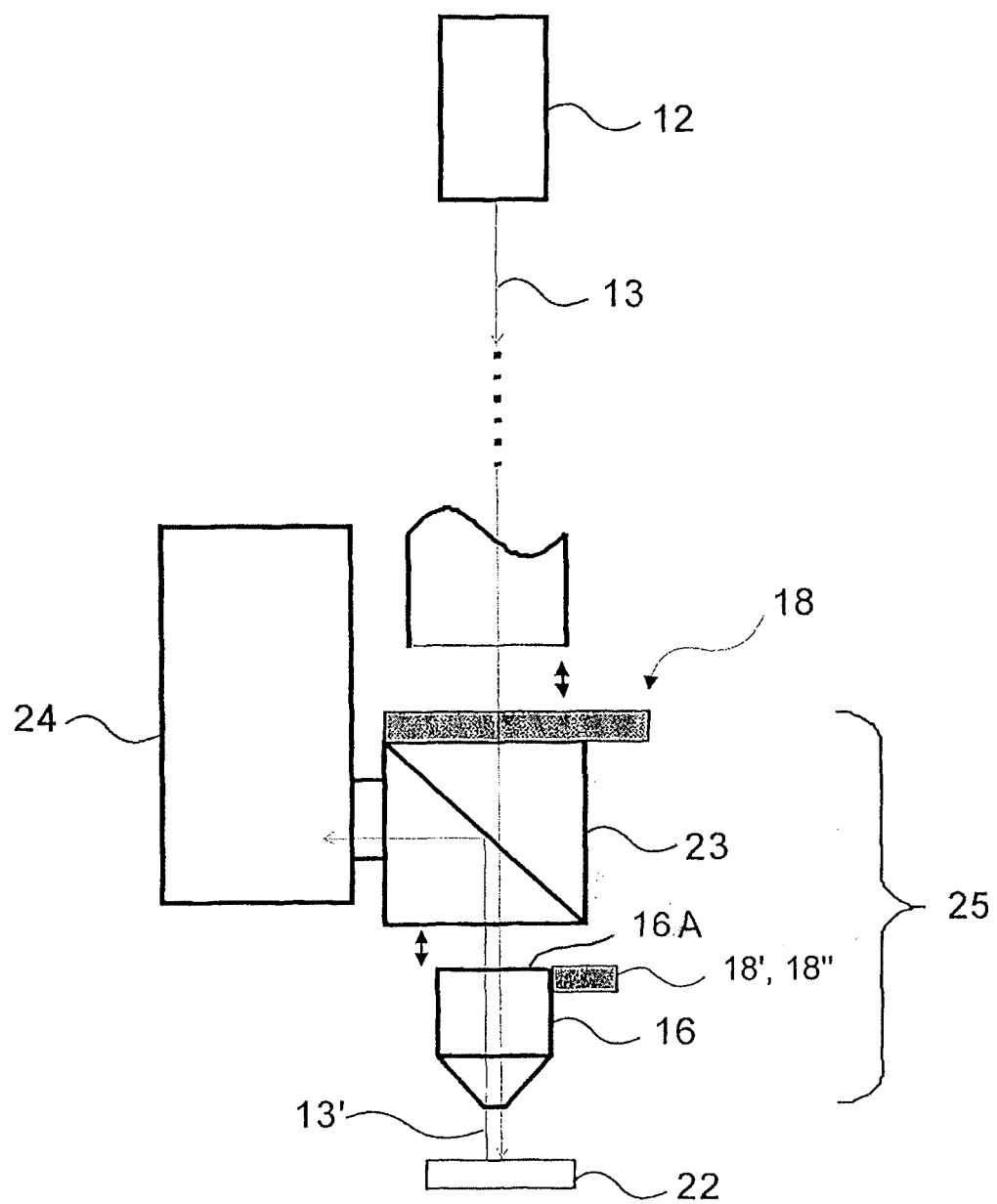
FIG. 2 is a schematic diagram of a laser scanning microscope according to the invention.
Figure 5:
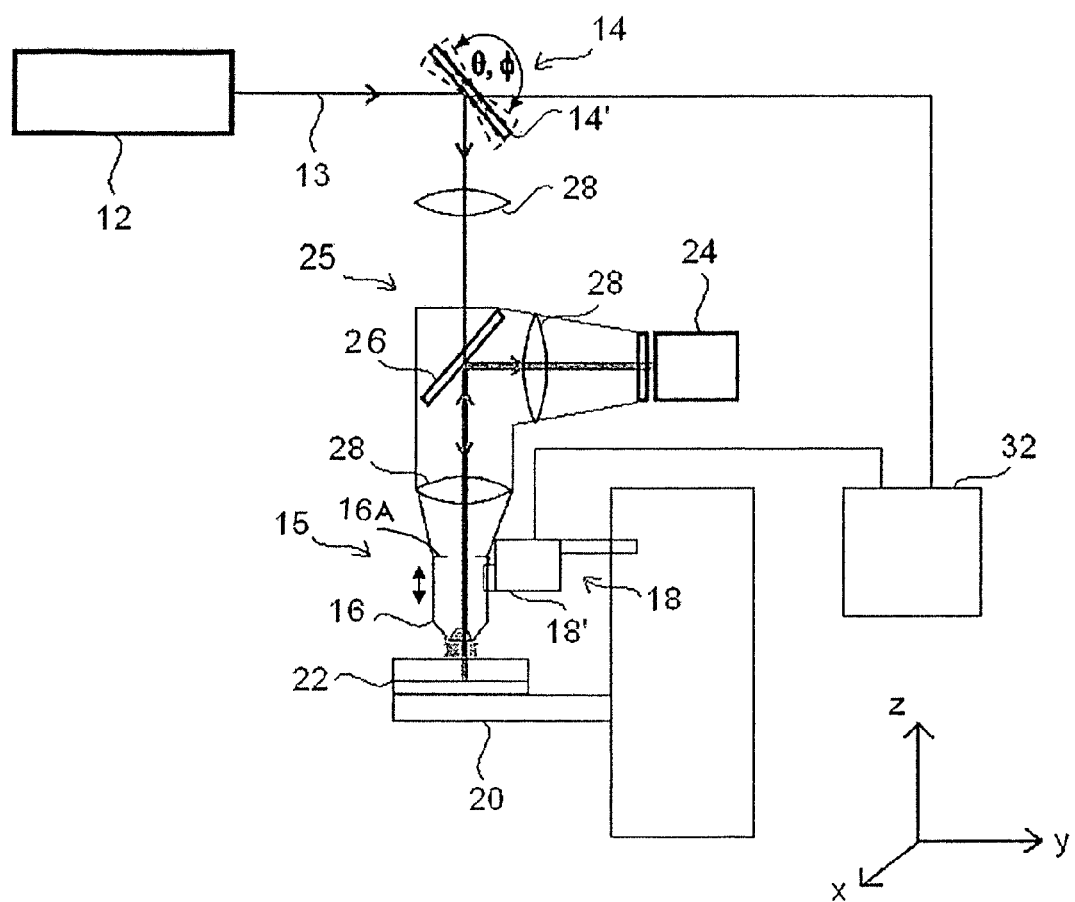
FIG. 5 is a schematic diagram of another embodiment of the laser scanning microscope according to the invention.

FIG. 2 is a schematic diagram illustrating an embodiment of a laser scanning microscope 15 according to the invention. The inventive microscope 15 comprises a laser source 12 providing a laser beam 13 which is focused onto a sample 22 (e.g. a biological specimen) via a microscope objective 16. In order to perform 3D sampling a drive 18 is provided for displacing the microscope objective 16 relative to the sample 22. Optics such as beam splitter 23 is arranged along the optical path of the scanning laser beam 13 for directing the reflected light 13' (which is understood to comprise both the laser beam reflected back from the sample 22 and the back fluoresced light as the case may be) to a suitable image detector 24, which is arranged to detect an image from the back aperture 16A (the image detector side aperture) of the objective 16, to thereby detect light reflected and scattered back from the sample or back fluoresced light emitted by the sample. Such an arrangement may involve the use of optical elements (such as dichroic mirror 26 and lenses 28 as depicted in FIG. 5) to image the back aperture 16A of the objective 16 onto the image detector 24 and to separate the signal beam 13' from the exciting laser beam 13.

The image detector 24 is preferably in communication with an image generating device, such as a computer 32 (see FIG. 5), which may also serve as the control system of the laser scanning microscope 15.

In contrast to the prior art solution where the objective 116 is displaced via the drive 118 independently from the detector 124, in the inventive microscope 15 both the objective 16 and the image detector 24 are connected to the drive 18 such that the drive 18 simultaneously displaces the image detector 24 with the objective 16. Thus, in the illustrated embodiment the objective 16, the image detector 24, the lenses 28 and the beam splitter 23 form a focusing-detecting unit 25 which can be displaced via the drive 18 as a single unit.

The drive 18 may be based on any conventional optomechanical solution for lifting and lowering the focusing-detecting unit 25 as well as for modifying the position of the focal plane within the sample, e.g. electromagnetic positioning of the optical parts, mechanical step motor drives, resonant driving of optical elements mounted on springs, or piezo devices may be used or a modified imaging system objective can be used, wherein only one small lens is moved within the objective, whereby the working distance of the objective (i.e. the position of the focal plane) can be changed without having to move the whole mass of the objective.

It is to be understood that a number of further focusing elements and optical guiding elements such as mirrors, lenses, beam deflectors, etc. may be arranged along the optical path of the scanning laser beam 13 between the laser source 12 and the beam splitter for directing the reflected, scattered or fluoresced light 13' to the image detector 24.

Figure 3:
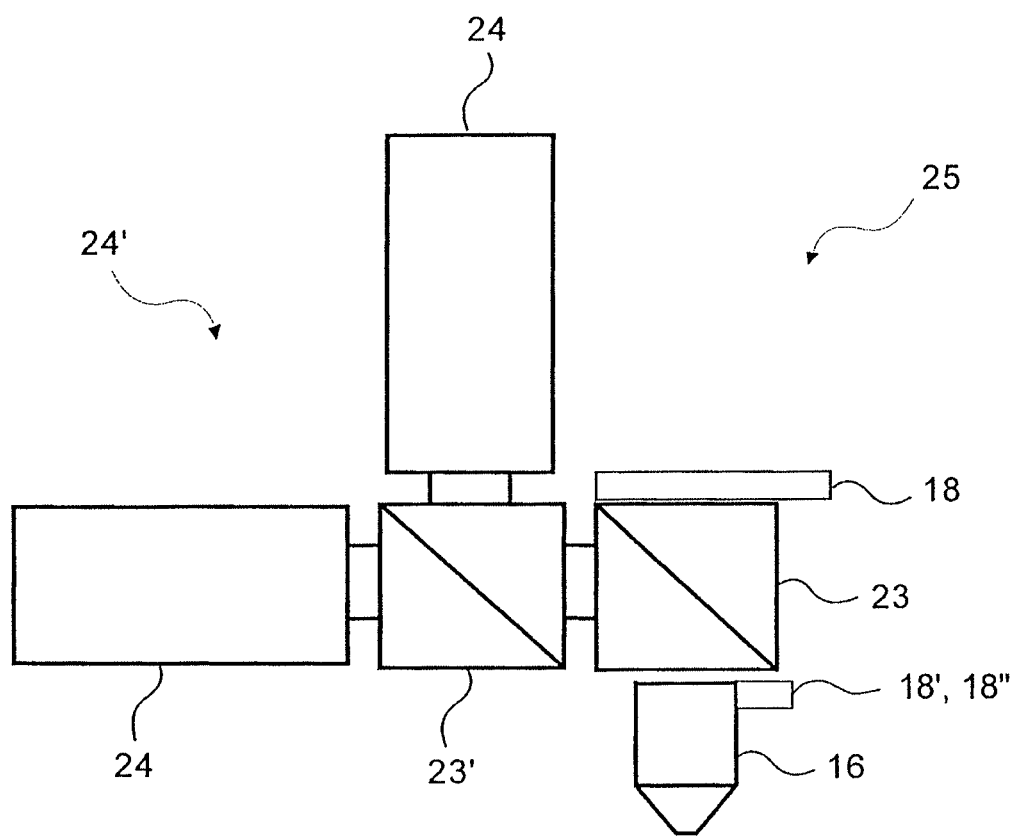
FIG. 3 is a schematic diagram of another embodiment of a focusing-detecting unit of the laser scanning microscope according to the invention.

FIG. 3 illustrates another preferred embodiment of the focusing-detecting unit 25 of the laser scanning microscope 15 according to the invention. This embodiment differs from the embodiment illustrated in FIG. 2 in that it is provided with image detector 24' comprising two separate image detectors 24. Reflected, scattered or fluoresced light directed to the image detector 24' via the first beam splitter 23 is further divided by a second beam splitter 23' which is interposed between the two image detectors 24. The separate image detectors 24 are preferably provided with a filter for detecting photons of different electromagnetic properties such as wavelength or polarisation. For example the image detectors 24 may be equipped with appropriate wavelength filters for detecting photons of only a specific wavelength. By using two fluorescent markers of different fluorescence peak wavelength two different measurements may be performed simultaneously. It may also be advantageous to have separate wavelength channels for detecting different wavelength laser beams 13 simultaneously sweeping the sample 22 along different XY paths.

The second beam splitter 23' may itself serve as the filter, e.g. it may be a wavelength selective beam splitter reflecting or transmitting only specific wavelengths, thereby the wavelength separation of the photons can be performed by the beam splitter 23'. In yet another possible application the image detectors 24 may be provided to detect different polarisation light, in this case the filter may comprise suitable polarising filters arranged before each image detector 24, or the second beam splitter 23' may be a polarising beam splitter.

Figure 4:
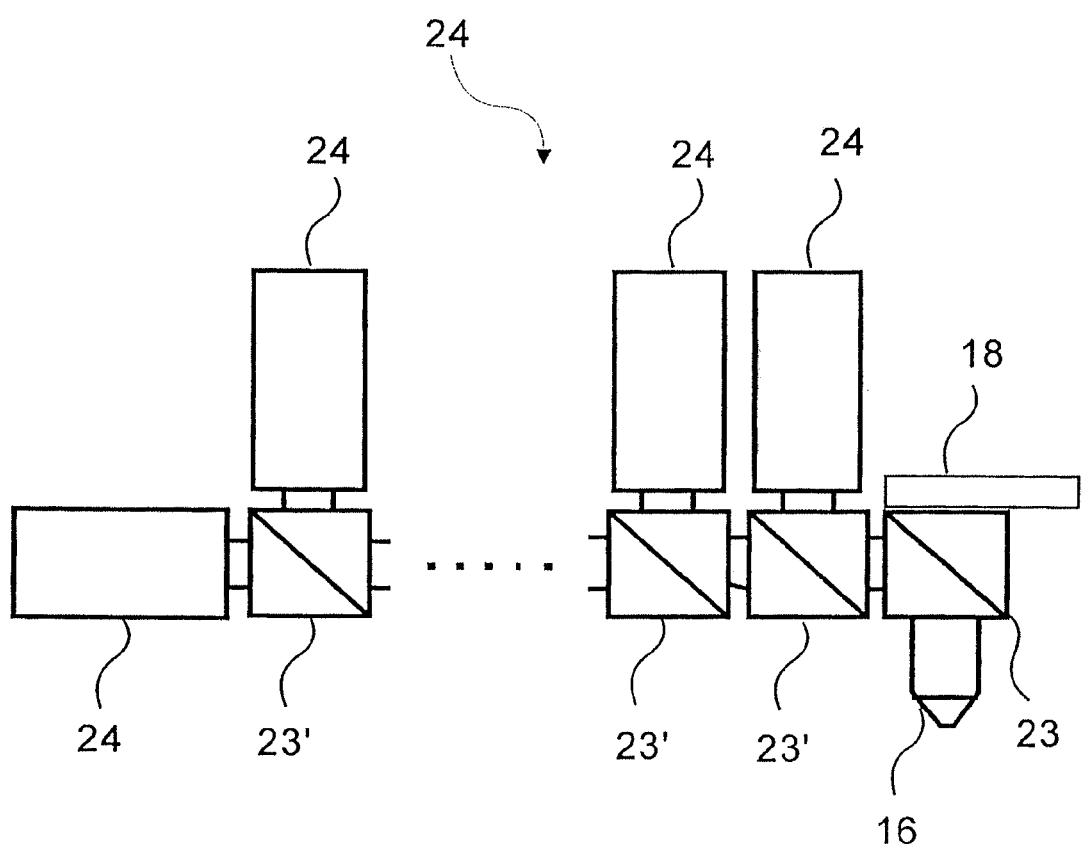
FIG. 4 is a schematic diagram of a further embodiment of a focusing-detecting unit the laser scanning microscope according to the invention.

The number of image detectors 24 is not limited to two. Any number of image detectors 24 may be used in cascade e.g. as in the image detector 24' illustrated in FIG. 4.

FIG. 5 is a schematic diagram illustrating another embodiment of a laser scanning microscope 15 according to the invention. The microscope 15 comprises a laser source 12 providing a laser beam 13; beam deflector 14 for deflecting the laser beam 13 in X and Y directions; objective 16, in this case a microscope objective 16; drive 18 for displacing a focusing-detecting unit 25 parallel to the optical axis of the objective 16; a sample stage 20 for holding or supporting a sample 22 (e.g. a biological specimen 22') under the objective 16; and an image detector 24.

In the embodiment illustrated in FIG. 5 depth scanning is achieved using the known two-photon (or multi-photon) laser excitation technology. It is to be noted however, that any other technology allowing for scanning at various focal depths, e.g. confocal microscope technology, could be applied in connection with the present invention.

For the purpose of two-photon laser excitation the laser source 12 can be a femtosecond impulse laser, e.g. a mode-locked Ti-sapphire laser providing the laser beam 13. In such case the laser beam 13 is made up of discrete laser pulses of MHz repetition rate and femtosecond pulse width.

In the embodiment illustrated in FIG. 5 a dichroic mirror 27 is arranged along the optical path of the laser beam 13 to separate the laser beam 13 provided by the laser source 12 from the fluorescence photons emitted by the excited fluorophores of the sample 22 under examination, and to direct the later to the image detector 24. Any suitable image detector 24 can be used, e.g. a photo multiplier, to detect the emitted photons. The image detector 24 may advantageously be suitable for time correlated photon counting or fluorescence lifetime imaging. In this case "time correlated" means that the image detector's time resolution is fast enough to measure the exact time of impact the fluorescent photons reaches its surface, therefore various delay information can be extracted from such measurements. For example in FLIM the elapsed time between excitation and emission is measured, which serves as an important signal when certain fluorescent probes were used.

Also, more than one image detector 24 provided with appropriate wavelength filters (or other type of filters for separating photons based on any other electromagnetic property, such as polarisation) can be arranged in a known way as explained above, if emitted photons of different properties (e.g. wavelengths) are to be detected separately.

The deflector 14 can be any suitable beam deflecting device, such as acousto-optical or electro-optical deflectors, galvanometric scanning mirrors 14' (mirrors mounted on galvanometric scanners configured to deflect the laser beam 13 in X and Y directions for scanning within a given focal plane), etc. Additional optical guides such as lenses 28 or mirrors (e.g. spherical mirrors guiding the laser beam 13 onto and between the scanning mirrors 14') can be provided to create a desired optical path and to hinder divergence of the laser beam 13.

For the sake of better visibility the microscope objective 16 and the image detector 24 are depicted spaced apart from each other, however the microscope objective 16 and the image detector 24 form a single focusing-detecting unit 25, which is mounted on the drive 18, which may be a mechanical step motor drive or other suitable device as explained above. Although FIG. 5 presents lenses 28 and the dichroic mirror 26 as being part of the focusing-detecting unit 25, it is to be understood that some of these elements may be omitted or replaced by other suitable optics, e.g. the beam splitter 23 illustrated in FIGS. 2 to 4.

Drive 18 may serve to set the Z position of the focal plane 29 of the objective 16, or an auxiliary drive (not illustrated) may be provided within the focusing-detecting unit 25 for oscillating the objective 16 independently from the rest of the focusing detecting unit 25. This is particularly advantageous in the case of 3D laser scanning microscopes 15, wherein the 3D scanning is performed by continuously oscillating the focal plane 29 of the microscope 15 relative to the sample 22. The following example relates to such a 3D laser scanning microscope 15, however, it should be appreciated that Z focusing may be performed by shifting the whole of the focusing-detecting unit 25 via the main drive 18.

The auxiliary drive 18" is preferably a piezo-positioner 18' capable of providing very fast micro- and even nano-scale displacements, but optionally other types of suitable devices can be used as well, as explained in connection with the main drive 18.

Figure 5A:
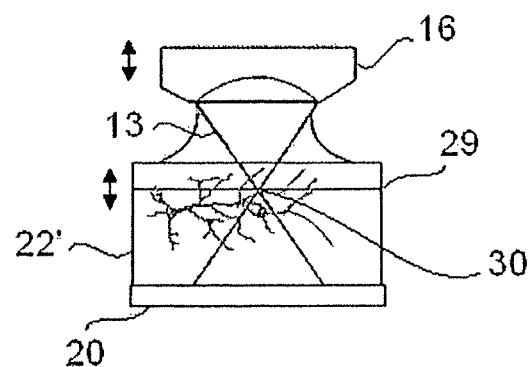
FIG. 5a is an enlarged view of a sample under the objective of the microscope of FIG. 5.

As can be seen in FIG. 5a when the objective 16 is displaced along its optical axis (i.e. in the Z direction) the focal plane 29 of the objective 16 is shifted relative to the sample 22 (depicted as a biological specimen 22'), thus the focus spot 30 (i.e. the focal volume of the laser beam 13) can be moved in the Z direction.

A control system is provided for controlling the beam deflector 14, and in the present embodiment the piezo-positioner 18' being generally the auxiliary drive 18" of the objective 16 or the drive 18 of the focusing-detecting unit 25 if no auxiliary drive 18" is provided. The control system can be a single unit, such as the computer 32 of the present embodiment or a microcontroller, or it can comprise a plurality of interrelated control units separately controlling components of the microscope 15, such as the piezo-positioner 18' and the deflector 14. In the latter case a main control unit can be provided for obtaining data (such as position feedback information) from the other control units, for analysing such data and for sending back appropriate control signals to the control units. The control system can be a built-in unit of the microscope 15 or it can be a separate device or a control software running on a separate device such as a computer program running on a separate computer.

Scanning the sample along a 3D trajectory is carried out in the following way.

Figure 6:
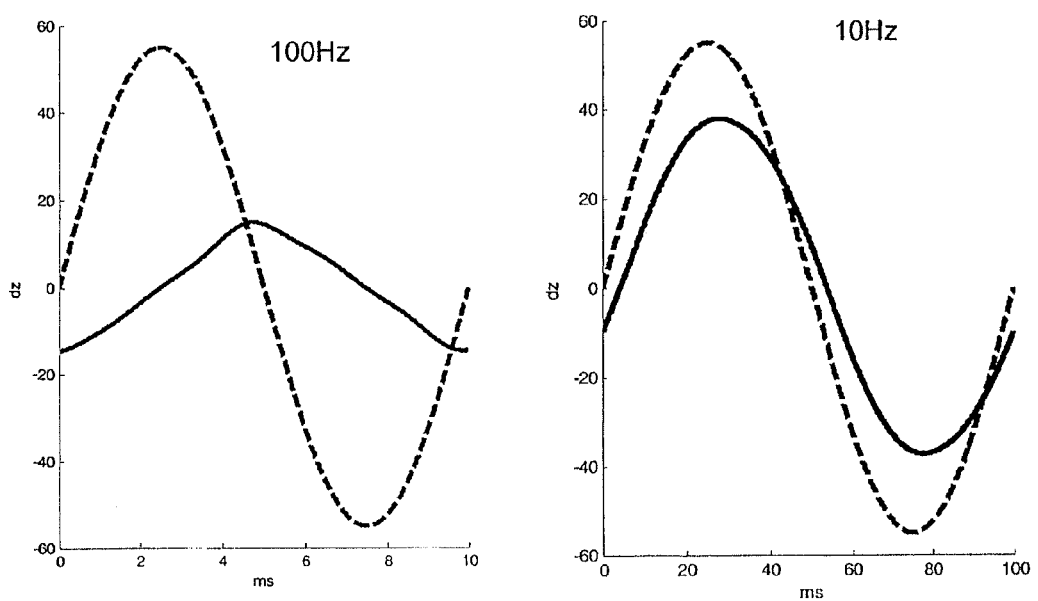
FIG. 6 illustrates a theoretical response function of a drive carrying the microscope objective and the real response function of the drive to a sinusoidal drive signal at two different frequencies.

First, the microscope 15 is calibrated for a desired Z-frequency (i.e. the scanning frequency in the Z direction). For example a sinusoidal voltage signal (or any other periodical signal) of the desired Z-frequency and amplitude is provided by the control system as drive signal for the piezo-positioner 18', which induces mechanical oscillation of the focusing-detecting unit 25 comprising the microscope objective 16 along its optical axis (in the Z direction). The displacement of the objective 16 in response to the sinusoidal drive signal can be obtained in any conventional manner, e.g. by an external measuring device or e.g. using the position feedback signal of the piezo-positioner 18'. A response function $z(t)$ is calculated from the time dependant displacement induced by the control system. FIG. 6 illustrates the obtained response function $z(t)$ and a theoretical response function $z'(t)$ corresponding to the displacement of an ideal piezo-positioner (zero mass, instantaneous response to a voltage change, etc.) at two different drive signal frequencies: a 10 Hz and 100 Hz. As can be seen the amplitude of the real response function $z(t)$ is reduced and its phase is shifted. The amplitude reduction can be compensated for by increasing the amplitude of the drive signal (the voltage signal) and the phase shift can be taken into account without difficulty. However, as the applied Z-frequency is increased (see the diagram showing the 100 Hz drive signal frequency) the shape of the resulting response function $z(t)$ starts to deviate from the shape of the drive signal (and the theoretical response function $z(t)$. In case of a sinusoidal drive signal the increase in the Z-frequency results in a less and less sinusoidal response function $z(t)$, which cannot be compensated for at the level of the drive signal.

The focal plane 29 of the objective 16 is at a given distance relative to the objective 16, thus it moves together with the objective 16 and the piezo-positioner 18'. Hence, the response function $z(t)$ is suitable for describing the position of the focal plane 29 since a simple linear relationship can be established between the two. For the sake of simplicity hereinafter the response function $z(t)$ is considered to correspond to the time dependant position of the focal plane 29 of the objective 16.

It was found that the response function $z(t)$ to a periodical signal (e.g. the above discussed sinusoidal signal) becomes stable after sufficient periods of the drive signal rendering the response function $z(t)$ suitable for calibrating the microscope 15. For example in the case of a sinusoidal drive signal 50-100 periods were found to be sufficient to obtain a reliable $z(t)$ function for calibration purposes.

The method according to the invention is based on the idea of generating a corresponding drive signal for the deflector 14, which takes the shape distortion of the stable response function $z(t)$ of the auxiliary objective drive 18'' (e.g. the piezo-positioner 18') into account.

Figure 7A:
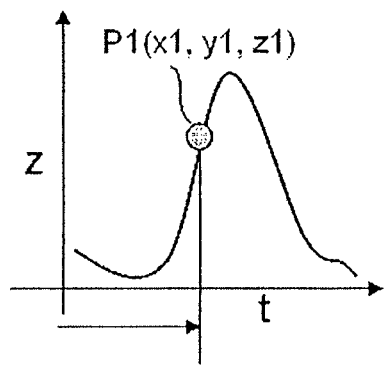
FIG. 7a is a diagram of the response function of the objective drive.
Figure 7B:
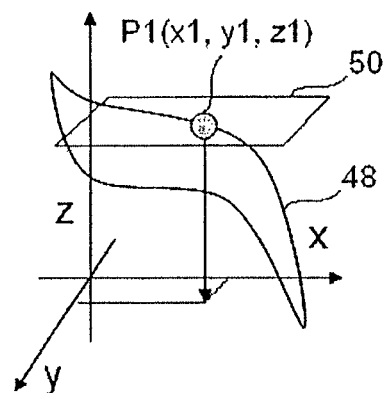
FIG. 7b is a diagram illustrating a 3D scanning trajectory.
Figure 7C:
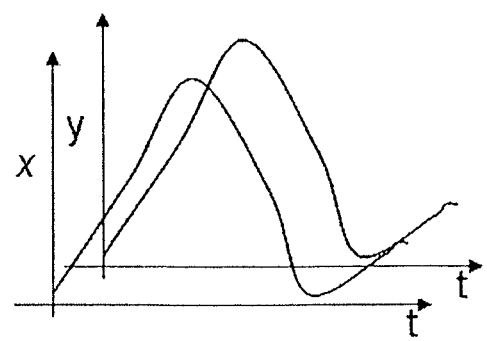
FIG. 7c is a diagram illustrating the calculated X-Y trajectory as a function of time.

FIGS. 7a to 7c illustrate how such XY drive signal can be generated by the control system. FIG. 7a is a diagram showing the Z position of the objective 16 as a function of time within a single oscillation period after the oscillation has become stable. FIG. 7b is a diagram illustrating a 3D scanning trajectory 48 passing through a plurality of scanning planes 50, i.e. the planes at different Z depths within the sample 22 where scanning is to be performed. The trajectory 48 is made up of scanning positions P (practically micro-volumes), which can be described by (x, y, z) coordinates. When wishing to scan a P1(x1, y1, z1) position lying in a given scanning plane 50 the following steps are performed by the control system. First, using the $z(t)$ response function (which is understood to correspond to the time dependant position of the focal plane 29 of the objective 16), a t1 time (instant) is determined when the focal plane 29 of the objective 16 will be at $z(t1)=z1$ height (i.e. the height where the focal plane 29 will coincide with the desired scanning plane 50), then an XY drive signal is generated for the deflector 14 to direct the focus spot 30 of the beam 13 to (x1, y1) position at the determined t1 time. The same calculation can be carried out for the whole of the 3D trajectory and the XY drive signal illustrated in FIG. 7c is generated. It should be noted that there can be an infinite number of t1 instances when the objective 16 is at z1 height since the drive signal of the piezo-positioner 18' is a periodical function. If the scanning Z-frequency is high and there are too many scanning positions in some scanning planes 50 to be scanned within one oscillation period, then each such position may be scanned in a separate oscillation period.

The above described method allows for the use of high Z-frequencies, e.g. in the range of 50-200 Hz permitting very fast 3D scanning of samples 22 in which only a fraction of the whole area of the scanning planes 50 is of interest. This is particularly useful where a large number of measurements need to be carried out on such a sample 22 under different environmental conditions, e.g. on a biological specimen 22 under different types of stimulations.

A further advantage of the present invention is that the above described method does not compromise the XY resolution.

Prior art laser scanning microscopes generally comprise a glass stage or other smooth-surfaced stages. However, with the use of high Z-frequencies a new problem arises: the vibrations of the oscillating objective 16 (or the focusing-detecting unit 25 as the case may be) can be transmitted to the stage 20 via the mechanical connections of the microscope 15 or the medium (gas or liquid) between the objective 16 and the sample 22. Thus simply placing the sample 22 on a prior art glass stage might not be sufficient to keep the sample 22 in position as the vibration of the stage 20 can cause slight displacement of the sample 22 during the measurement. Such displacements could render the measurement useless as the volumes of interest of the sample 22 could leave the precalculated scanning trajectories 48. It is therefore suggested to provide the inventive scanning microscope 15 with securing means for fixing the position of the sample 22 during the measurement. Such securing means can be a stage 20 having a rough surface, preferably a surface with gratings, thereby the sample 22—in particular a soft biological specimen 22'—can sink into the surface with the gratings pressing into the bottom of the specimen 22'. For example the stage 20 can be formed as a grid 60 (FIG. 8a), e.g. a metal grid or a grid of a suitable hard polymeric material. As illustrated in FIG. 8b the biological specimen 22' sits firmly on the grid 60 whereas parts of its bottom surface 22a sink into the mesh spaces 62, while the grid 60 itself presses into the bottom surface 22a of the specimen 22' thereby securing the specimen 22' in its position.

Apart from the better sample-retaining properties of the grid 60 as compared to the prior art smooth-surfaced stages, the grid 60 has a further advantage when imaging living biological specimens 22', which need to be kept in a special physiological solution. The objective 16 is preferably a water immersion objective (as illustrated in FIG. 5a) and the living specimen 22' is immersed in the physiological solution, preferably circulated around the specimen 22'. The use of a grid 60 as the stage 20 provides the extra advantage of allowing the living specimen 22' to be in contact with the physiological solution at its bottom surface 22a as well through the mesh spaces 62 of the grid 60.

FIG. 9 illustrates a further embodiment of a scanning microscope 15 according to the invention. In this embodiment the focusing involves more than one optical elements: an objective 16 and a number of lenses 17' making up a lens system 17. Instead of, or in addition to displacing the objective 16 via the auxiliary drive 18'' it is also possible to change the position of the focal plane 29 within the sample 22 by displacing one or more other optical elements, via one or more auxiliary drive 18″. For example one or both lenses 17′ of the depicted lens system 17 may be provided with electromagnetic positioners as auxiliary drives 18″, which may be controlled by the control system of the scanning microscope 15. The electromagnetic positioners 18″ can be any conventionally used electromagnetic linear drive mechanism. Furthermore, any other suitable auxiliary drive 18″ can be used as well, e.g. piezo-positioners or step motor drives.

For the purpose of performing the inventive method, the auxiliary drive 18″ can be provided by the calculated compensated drive signal, and one or more lenses 17 may be oscillated independently.

It is also possible to provide phase shifted drive signals for each auxiliary drive 18″ of the different optical elements, which are to be oscillated for the purpose of changing the position of the focal plane 29. This allows for additional ways of compensating for deviation of the shape of the response functions z(t) from the drive signals. For example the drive signals of two optical elements—such as the two lenses 17′—may be in opposite phase to each other.

Figure 1:
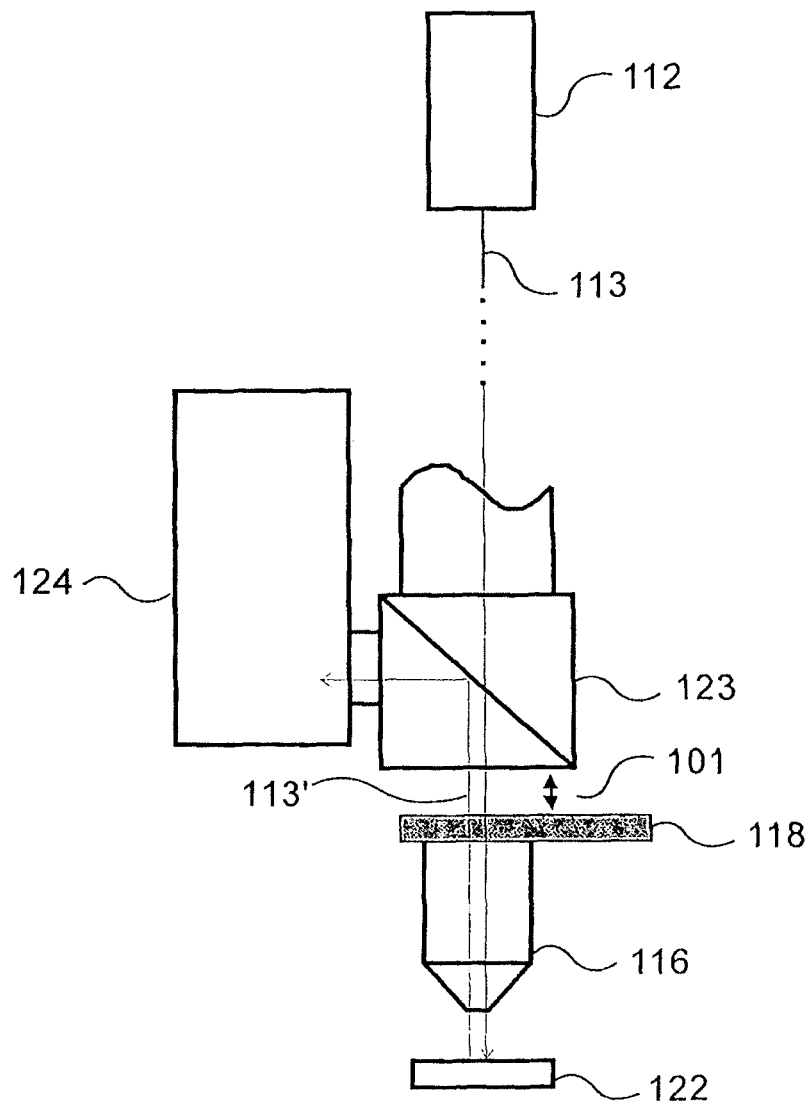
FIG. 1 is a schematic diagram of a prior art laser scanning microscope.

In this case the objective 16, the lens system 17 and the image detector 24 can all be connected to a common main drive 18 which allows for the lifting and lowering of the focusing-detecting unit 25 when the sample 22 is to be inserted or removed from under the objective 16. Thereby the advantage of shortening the optical path between the objective 16 and the image detector 24 (or image detector 24′) can be achieved by eliminating the extensively large gap 101 in comparison with the prior art microscope 100 (illustrated in FIG. 1) since the amplitude of the oscillation applied for the purpose of the 3D scanning is in the mm or µm range, while the prior art gap 101 for changing the sample 122 under the microscope objective 116 is about 30-40 mm wide.

It is to be noted that it is also possible to provide an auxiliary drive 18″ for oscillating the objective 16 in the embodiment illustrated in FIG. 5 as explained above, while the common drive 18 serves to lift and lower the whole of the focusing-detecting unit 25. This has the further advantage that when oscillating the objective for the purpose of 3D scanning higher frequencies may be used since the image detector does not need to oscillate together with the objective 16.

It is also possible to provide accousto-optical deflector for changing the Z-position of the focal plane 29 in the course of 3D sampling in which case no auxiliary drives 18″ are needed and 3D scanning can be based entirely on acousto-optical techniques. In this case the deflector 14 may comprise the acousto-optical deflectors for 3D scanning. Alternatively fluid lenses and/or zoom optics may be provided, which are suitable for changing the divergence of light, thus changing the focal plane 29 of the objective 16 without physically moving it, thus suitable for random accessing points in a 3D volume.

Although the above described embodiments relate to an upright microscope, it will be apparent for the skilled person that the common drive 18 for the focusing-detecting unit 25 can be applied in an invert microscope as well. Moreover, the focusing-detecting unit 25 may be positioned at any angle, for example the microscope stage might be vertical (e.g. when examining biological tissue slices attached to a sample slide) in which case the focusing-detecting unit 25 comprising the objective 16 and the image detector 24 can be displaced horizontally.

The above-described embodiments are intended only as illustrating examples and are not to be considered as limiting the invention. Various modifications will be apparent to a person skilled in the art without departing from the scope of protection determined by the attached claims.

The invention claimed is:

1. Laser scanning fluorescent microscope for scanning a sample, the microscope being a multi-photon laser scanning microscope and comprising a focusing-detecting unit containing:
   an objective for focusing a laser beam from a laser source, the objective having a back aperture and a focal plane, and
   an image detector for detecting back fluoresced light emitted by the sample in response to multi-photon excitation, the image detector being arranged to detect an image from the back aperture of the objective;
and comprising a drive for simultaneously displacing the objective and the image detector of the focusing-detecting unit as a single unit.

2. The laser scanning microscope according to claim 1, wherein the drive changes the position of the focal plane in the course of 3D sampling; or wherein an auxiliary drive displaces the at least one optical element of the objective for changing the position of the focal plane in the course of 3D sampling; or wherein acousto-optical deflectors change the position of the focal plane in the course of 3D sampling.

3. The laser scanning microscope according to claim 1, wherein the detector provides time correlated photon counting or fluorescence lifetime imaging.

4. The laser scanning microscope according to claim 1, wherein the drive comprises a piezo positioner and/or a mechanical actuator and or an electromagnetic positioner.

5. The laser scanning microscope according to claim 1, wherein the detector comprises at least two detectors having a filter selectively detecting refracted or back fluoresced light passing through the back aperture of the objective according to an electromagnetic property of the light.

6. The laser scanning microscope according to claim 5 wherein the filter comprises wavelength filters arranged before the detectors or at least one wavelength selective beam splitter arranged before the detectors or at least one polarising beam splitter.

7. The laser scanning microscope according to claim 1, wherein the laser scanning microscope further comprises a deflector selected from the group consisting of a galvanometric scanning mirror or an acousto-optical deflector.

8. The laser scanning microscope according to claim 1, wherein the sample is a biological specimen and the microscope further comprises a support grid for the biological specimen having mesh spaces through which the biological specimen can be nourished with a physiological solution.

9. The laser scanning microscope according to claim 1, wherein the microscope is an upright or an invert microscope.

* * * * *